United States Patent Office 3,621,818
Patented Nov. 23, 1971

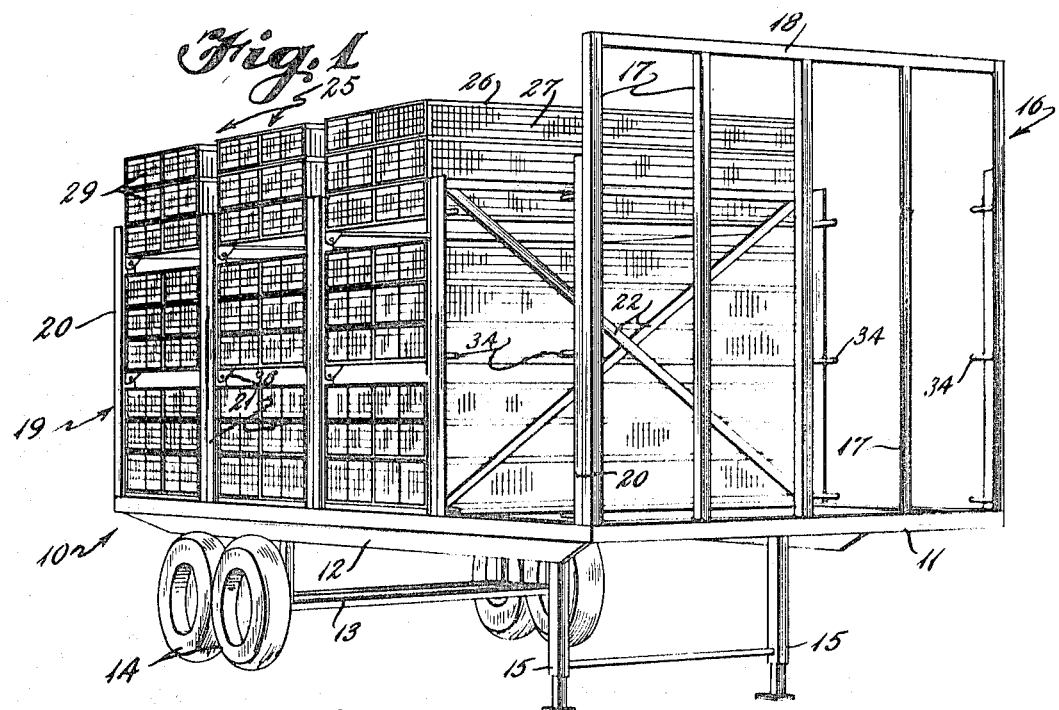
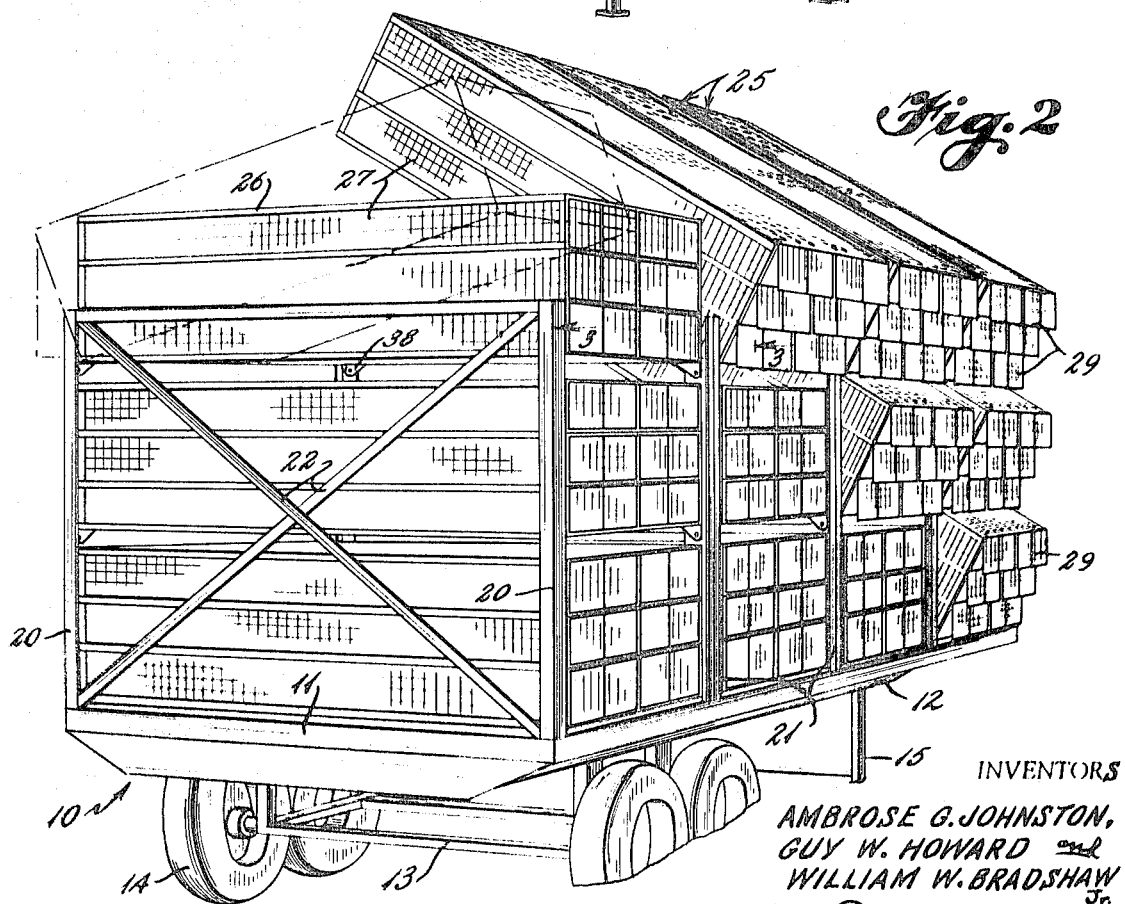

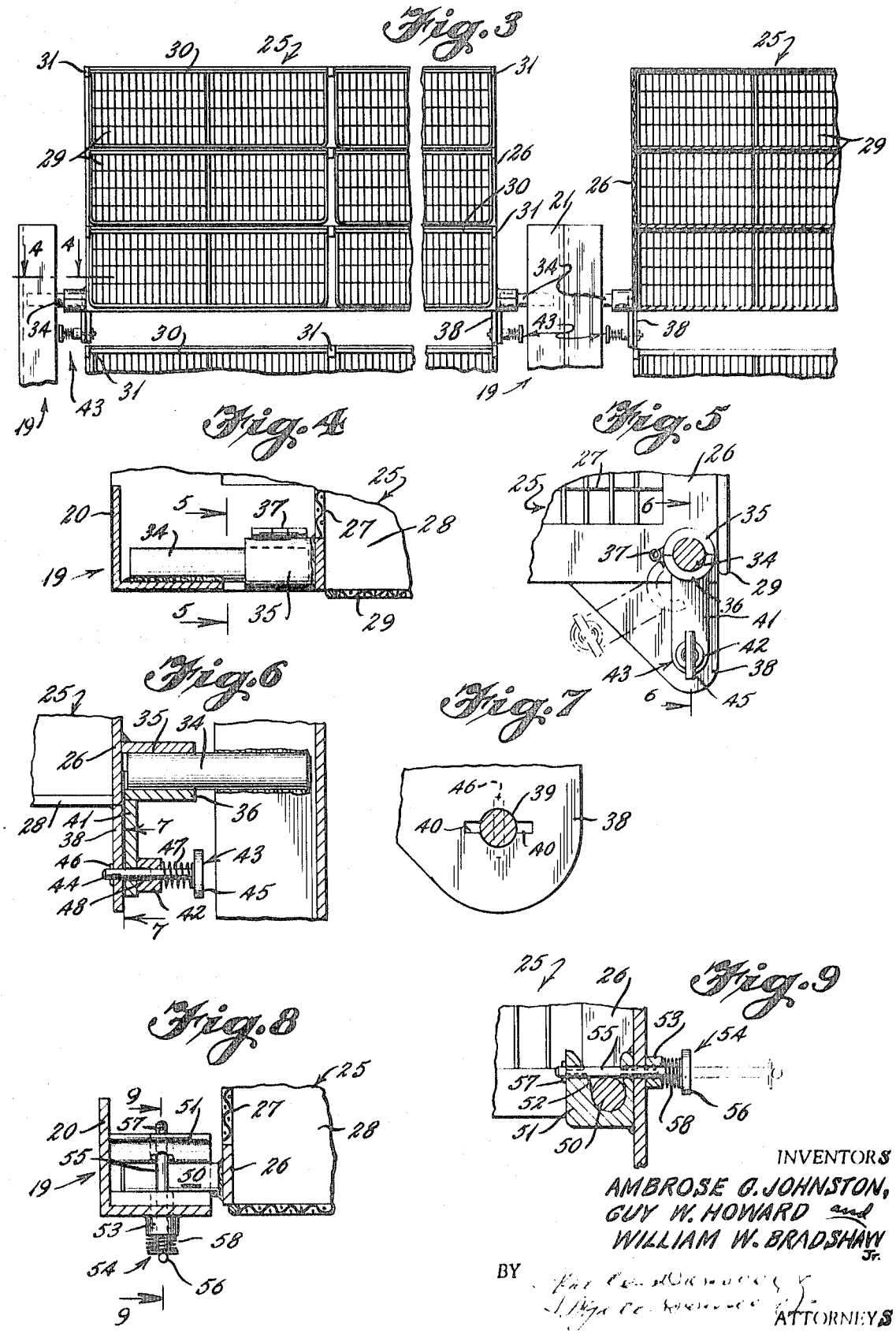

3,621,818
DEVICE FOR THE TRANSPORTATION AND
QUICK UNLOADING OF POULTRY AND
OTHER COMMODITIES
Ambrose G. Johnston, Rte. 2, Box 247A; William W.
Bradshaw, Jr., P.O. Box 45; and Guy W. Howard,
P.O. Box 12, all of Rose Hill, N.C. 28458
Filed Nov. 20, 1969, Ser. No. 878,471
Int. Cl. B61d 9/00
U.S. Cl. 119—12                    3 Claims

ABSTRACT OF THE DISCLOSURE

The device of the present invention includes a base frame, which may consist merely of side and end members, which are carried in superimposed relation multiple tiers of containers for poultry or other commodities, the containers having their ends provided with closures which can be secured in position or released for the loading and unloading of the same, and being provided also with releasable pivotal supports at both ends so that either end of the containers may be released and elevated for discharging the contents from the opposite ends.

BACKGROUND OF THE INVENTION (1) Field of the invention

The invention is in the field of Animal Husbandry, Confining and Restraining Devices.

(2) Description of the prior art

Various types of coops or containers for fowls have been provided in the prior art; however, these have been subject to criticism as being of limited capacity, fragile, expensive, short-lived, as well as requiring too much time and effort to load and unload, frequent replacement, and the like, and required more than one workman in the use of the same.

SUMMARY OF THE INVENTION AND OBJECTS

The invention is a skeleton frame having generally parallel side members with coops or containers disposed across the same and supported in a series of tiers on pivots with loading and unloading restraining closures at the ends of the tiers, so that the coops or containers can be loaded in horizontal position, transported to a destination, and the closures unfastened and the coops or containers tilted to discharge the contents. The skeleton frame may be mounted upon a vehicle such as a part of a trailer, a truck, or merely a support for ready transportation to its destination.

It is an object of the invention to provide a simple, inexpensive, quickly loadable and unloadable device for hauling fowls or other commodities, as well as a device of this character of durable construction in which the coops do not have to be frequently replaced but will last for an indefinite period, and the device can be operated by one person.

BRIEF DESCRIPTION OF THE DRAWINGS

FIG. 1 is a perspective of the front of a poultry vehicle and illustrating one application of the invention.

FIG. 2 is a rear perspective thereof.

FIG. 3 is an enlarged fragmentary side elevation.

FIG. 4 is an enlarged fragmentary section on the line 4—4 of FIG. 3.

FIG. 5 is a fragmentary detail section on the line 5—5 of FIG. 4.

FIG. 6 is a section on the line 6—6 of FIG 5.

FIG. 7 is an enlarged section on the line 7—7 of FIG. 6.

FIG. 8 is an enlarged section similar to FIG. 4 of a modified form of the invention, and FIG. 9 is a section on the line 9—9 of FIG. 8.

DESCRIPTION OF THE PREFERRED EMBODIMENTS

With continued reference to the drawings, a vehicle such as a trailer 10 is provided and such vehicle has a bed 11 forming a skeleton floor or frame mounted on a chassis 12 having an axle 13 supported by ground-engaging wheels 14. The wheels 14 are disposed toward the rear of the trailer and when the device is in use the front of the trailer is supported by the fifth wheel of a conventional tractor (not shown). However, when the device is not in use, the front end of the trailer is normally supported by extendable and retractable legs 15.

At the front of the bed 11, a generally vertical frame or wall 16 is provided which includes a series of generally parallel upright members 17 connected at their upper ends by a cross member 18. Normally the members 17 and 18 are constructed of conventional structural shapes, such as angles or channels; however, a box configuration could be used for additional strength.

Spaced along both sides of the bed 11 are a plurality of structural members or posts 19 with the end posts being in the form of angle members 20 and the intermediate posts being in the form of T-shaped members 21. If desired the T-shaped members 21 can be constructed of angle members with one leg of each angle being in abutting relation with the leg of the other angle and welded or otherwise fixed thereto. The front angle members 20 can be connected to the upright members 17 to provide additional strength and rigidity and preferably the rear angle members 20 are connected by cross braces 22 for added strength.

Between each pair of posts 19 a plurality of poultry coops or cages 25 are disposed generally transversely of the trailer bed 11 and such cages have their opposite ends swingably connected to and between a pair of cooperating posts at each side. The cages can be of any desired construction, although cages which have been divided into six separate compartments have been found satisfactory. As illustrated, each cage includes a frame 26 having walls 27 of open mesh wire or the like extending along both sides and the top of the frame 26. Preferably an intermediate vertical wall of wire mesh extends the full length of the frame 26 to divide the cage into right and left-hand portions and each of such portions is provided with vertically spaced generally horizontal floors 28 which may be constructed of either wire mesh or sheet material. The floors 28 divide each of the right and left-hand portions into multiple compartments. Each cage contains six compartments and each of such compartments is provided with a swinging door 29 having a hinge pin 30 along its upper edge swingably mounted within bearings 31 carried by the frame 26. If desired, each of the doors 29 may be provided with clip or locking means (not shown) engageable with the floors 28 to maintain the doors closed and to prevent the escape of the poultry.

With reference to FIGS. 3–7, in order to discharge poultry from the cages 25 to either side of the trailer 10, a pin or stub shaft 34 is welded or otherwise attached to each of the posts 19 adjacent to the lower portion of each of the cages 25. An upper semi-circular bearing 35 is welded or otherwise attached to each side of the frame 26 adjacent to the lower portion thereof. A lower semi-circular bearing 36 is swingably connected to the upper bearing 35 by a hinge 37 to form a split bearing which, as illustrated in FIG. 5, will provide a substantially continuous bearing surface in one position, but which can be separated, as illustrated in phantom, to permit the cage to be removed from the pins 34.

The lower bearing 36 may be retained in a load-bearing position by providing a downwardly extending lug 38 at each side of the cage 25 and such lug has a generally circular opening 39 with diametrically opposed slots 40 in communication therewith. The lower bearing 36 is provided with a downwardly extending arm 41 having a boss or enlargement 42 at its lower end. A lock pin 43 is axially slidably mounted through the arm 41 and the boss 42 and such pin includes a shank 44 having an enlarged head 45 at one end and a cross pin 46 adjacent its other end. A spring 47 preferably is disposed between the boss 42 and the head 45 to urge the pin 43 outwardly. A counterbore 48 extends through the arm 41 and partially through the boss 42 and such counterbore is of a size to receive the cross pin 46. When the upper and lower bearings 35 and 36 are in load-supporting relation, the lock pin 43 is substantially in alignment with the opening 39 of the lug so that when the cross pin 46 of the lock pin is rotated into alignment with the slots 40, the lock pin can be pushed inwardly against the tension of the spring 47 so that the cross pin passes through the slots 40. Thereafter the lock pin is rotated substantially 90° to prevent the accidental withdrawal of the lock pin.

With reference to FIGS. 8 and 9, a modified form of releasable hinge is provided for each end of the cage 25. In this modification a pin or stub shaft 50 is welded or otherwise attached to the lower portion of the frame 26 at each side and at each end. A cooperating bearing 51 is provided for each of the pins 50 and each of such bearings is welded or otherwise attached to one of the posts 19. The bearing 51 includes a recess 52 of a size to receive the pin 50 in a position to swingably support the same.

In order to prevent accidental removal of the pin from the bearing, a boss or enlargement 53 is welded or otherwise attached to the post 19 and is adapted to axially slidably receive a lock pin 54 which extends through the post as well as the bearing 51. The lock pin includes a shank 55 having a head 56 at one end and a cross pin 57 adjacent to the opposite end. A spring 58 is disposed between the boss 53 and the head 56 and is adapted to urge the lock pin 54 outwardly. The opening through the post 19 and the bearing 51 is provided with slots, as previously described, so that the lock pin 54 normally will be disposed above the pin 50 but can be retracted to permit the cage to be pivoted about the pins on the opposite end of the cage.

In the operation of the device, the cages 25 are filled with live poultry while such cages are in generally horizontal position with the hinge pins on each side of the cage locked in position. After the cages have been filled, a chain or rope normally is secured to one side of the vehicle and extends up one side of the cages across the top and down the other side where it is secured to the opposite side of the bed. One of the ropes or chains is provided for each tier of swinging doors 29 for preventing the doors from accidentally opening during transit. The trailer is then driven to a poultry handling plant or other facility which is to receive the poultry. Upon arrival the ropes or chains are removed and the trailer is located adjacent to a poultry receiving enclosure or conveyor or the like. Thereafter the swinging doors 29 on the sides of the cages adjacent to the conveyor are loosened or released and the lock pins 43 or 54 on the opposite ends of the cages are free to open.

Thereafter the cage is tilted, as illustrated in FIG. 2, so that the poultry within the cage will slide by gravity through the swinging doors 29. After the poultry has been discharged from the cages, such cages are returned to a horizontal position and the lock pins 43 or 54 are reset to permit the trailer to leave the discharge area for another load.

It will be apparent from the foregoing that a simple relatively inexpensive device is provided for the loading, transportation and quick unloading of poultry by one person, and such device is usable for other commodities than poultry. Further, the cages or containers are of a durable character, not requiring frequent replacement and resulting in a substantial savings in the use of the same.

What is claimed is:

1. Apparatus for use in transporting and quick unloading of poultry comprising a base adapted to be mounted on a vehicle, a plurality of posts mounted on opposite sides of said base in spaced relationship to each other, the posts on one side of said base being generally parallel with the posts on the other side thereof, a plurality of containers of a length to extend from a position adjacent to the posts on one side of the base to a position adjacent to the posts on the other side, said containers being in stacked relationship between pairs of posts with a small space between adjacent containers, each container having a frame, portions of each frame being located adjacent to the posts on opposite sides of said base, fixed shaft means carried by one of said frame and post at each side of said container and at each end thereof, said shaft means being mounted in a generally horizontal plane, bearing means fixed to the other of said frame and post for cooperatively receiving said shaft means in a manner to permit said container to swing about either end, and movable means for releasably locking said shaft means and said bearing means together, whereby said containers are locked to said posts during the transporting of the poultry and either end of each of said containers may be released from the adjacent post and the containers may be tilted to discharge poultry from the containers.

2. The structure of claim 1 in which said shaft means is fixed to said posts, each of said bearing means includes first and second portions, said first portion being fixed to said container and said second portion being swingably connected to said first portion.

3. The structure of claim 1 in which said shaft means is fixed to said container, said bearing means is fixed to the posts, and releasable pin means for locking said shaft means and said bearing means in assembled relation while permitting relative rotation therebetween.

References Cited

UNITED STATES PATENTS

| | | | |
|---|---|---|---|
| 1,069,749 | 8/1913 | White | 298—17.6 UX |
| 1,347,397 | 7/1920 | Newman | 119—17 |
| 1,837,308 | 12/1931 | Winter | 298—17.6 |
| 2,099,774 | 11/1937 | Spencer | 119—12 |
| 2,906,557 | 9/1959 | Garabedian et al. | 298—18 X |

HUGH R. CHAMBLEE, Primary Examiner

U.S. Cl. X.R.

119—17